(12) United States Patent
Sedarat et al.

(10) Patent No.: US 11,848,794 B1
(45) Date of Patent: *Dec. 19, 2023

(54) DATA TRANSMISSION USING ALERT SIGNALS TO CARRY DATA

(71) Applicant: Ethernovia Inc., San Jose, CA (US)

(72) Inventors: Hossein Sedarat, San Jose, CA (US); Ramin Shirani, Morgan Hill, CA (US); Roy T. Myers, Jr., Morgan City, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,469

(22) Filed: Nov. 8, 2022

Related U.S. Application Data (63) Continuation of application No. 16/831,357, filed on Mar. 26, 2020, now Pat. No. 11,516,038.

(60) Provisional application No. 62/825,724, filed on Mar. 28, 2019.

(51) Int. Cl.
| | |
|---|---|
| *G06F 15/16* | (2006.01) |
| *H04L 12/18* | (2006.01) |
| *H04Q 3/00* | (2006.01) |
| *H04L 65/1101* | (2022.01) |

(52) U.S. Cl.
CPC ...... *H04L 12/1895* (2013.01); *H04L 65/1101* (2022.05); *H04Q 3/0025* (2013.01)

(58) Field of Classification Search
CPC ............ H04L 12/1895; H04L 65/1101; H04Q 3/0025

USPC ......................................................... 709/207
See application file for complete search history.

(56) References Cited

U.S. PATENT DOCUMENTS

| | | | |
|---|---|---|---|
| 8,989,762 B1 * | 3/2015 | Negus | H04B 1/0475 455/454 |
| 10,754,409 B1 | 8/2020 | Benyamin et al. | |
| 11,516,038 B1 | 11/2022 | Sedarat et al. | |
| 2008/0112479 A1 | 5/2008 | Garmany et al. | |
| 2010/0309951 A1 | 12/2010 | Dowla et al. | |
| 2015/0230105 A1 * | 8/2015 | Negus | H04W 72/20 370/329 |
| 2018/0191383 A1 | 7/2018 | Balakrishnan et al. | |
| 2019/0379473 A1 | 12/2019 | Hotaka et al. | |
| 2020/0177522 A1 | 6/2020 | Lo | |
| 2020/0235825 A1 | 7/2020 | Ehlert et al. | |
| 2021/0302621 A1 | 9/2021 | Brown | |

FOREIGN PATENT DOCUMENTS

| | | | | |
|---|---|---|---|---|
| WO | WO-9713353 A1 * | 4/1997 | ........... | G10L 19/012 |

OTHER PUBLICATIONS

"U.S. Appl. No. 16/831,357, Non Final Office Action dated Feb. 3, 2022", 19 pgs.

(Continued)

*Primary Examiner* — Lan Dai T Truong
(74) *Attorney, Agent, or Firm* — Schwegman Lundberg & Woessner, P.A.

(57) ABSTRACT

Various embodiments provide for data transmission using alert signals to carry data, which can be used in such applications as data network communications between sensors (e.g., cameras, motion, radar, etc.) and computing equipment within vehicles (e.g., smart and autonomous cars).

20 Claims, 7 Drawing Sheets

(56) References Cited

OTHER PUBLICATIONS

"U.S. Appl. No. 16/831,357, Response filed May 3, 2022 to Non Final Office Action dated Feb. 3, 2022", 13 pgs.
"U.S. Appl. No. 16/831,357, Notice of Allowance dated Aug. 2, 2022", 14 pgs.
U.S. Appl. No. 16/831,357 U.S. Pat. No. 11,516,038, filed Mar. 26, 2020, Data Transmission Using Alert Signals to Carry Data.

\* cited by examiner

DATA TRANSMISSION USING ALERT SIGNALS TO CARRY DATA

CROSS-REFERENCE TO RELATED APPLICATION

This application is a continuation of U.S. patent application Ser. No. 16/831,357, filed on Mar. 26, 2020, which claims priority to and the benefit of U.S. Provisional Patent Application No. 62/825,724, filed on Mar. 28, 2019, which are incorporated herein by reference.

TECHNICAL FIELD

Embodiments described herein relate to data communications and, more particularly, to systems, methods, devices, and instructions for data transmissions (e.g., lower power data transmissions) using alert signals to carry data.

BACKGROUND

While Ethernet physical layer standards typically specify symmetric communication systems (e.g., one that supports identical data rate in both directions of a data link, such as 10 Gbps in both directions), certain applications are better suited to use an asymmetric Ethernet-based communication system, where the data rate in one direction of a given data link between two devices is different from the rate in the other direction of the given data link. Examples of such applications include, without limitation: applications where data in one direction can fluctuate and demand varying data throughput with time; a network-attached display that consumes a large amount of data but may generate only limited amounts of data; and a network-attached camera sensor that generates large amount of data and needs very limited control input. For instance, a camera sensor being used by an automobile can send multi-gigabits/s data (e.g., camera captures multiple frames a second) and would only need to receive very little data to control operation of the camera sensor (e.g., basic controls to zoom, pan, etc.). In such an instance, the camera sensor can establish and use an asymmetric data link with a processor of the automobile, where the data rate from the processor to the camera sensor is at a lower than the data rate from the camera to the processor. In doing so, the processor (as a data transmitter) and the camera (as a data receiver) can use less power than it would otherwise would if a symmetric data link was used instead.

Some existing Ethernet standards define a low power feature known as Energy-Efficient Ethernet (EEE), which can provide significant power savings when there is no data to transmit between devices. For some implementations, EEE is defined as an asymmetric data communications scheme in which a data transmitter of a device can be in low-power idle (LPI) mode when it has no data to send and while its EEE data link-partner is transmitting data in normal mode. While in LPI mode, a number of components in the transmitter or receiver implementing EEE may be shut down to save power. When the data transmitter of the device has data to send, the data transmitter can transition out of LPI mode and into normal mode (e.g., to facilitate data transmission as bursts of data). Generally, an upper layer network component of a transmitter-side device (e.g., application layer) decides whether there is no data to transmit on the transmitter-side device and instructs the physical layer (PHY) of the transmitter-side device to transition into (or transition out of) LPI mode accordingly.

Though EEE is currently available to lower power usage by devices during Ethernet-based communication, traditional EEE still has high peak power usage given that while in LPI mode, receiver components of an EEE receiving device generally continue to operate (e.g., remain active) so that the EEE receiving device can monitor for one or more signals, such as Alert signals (from an EEE transmitting device to the EEE receiving device) to signal a transition from LPI mode to normal mode. In applications that involve high data speeds, such as 10 Gbps, the power consumption by receiving components while monitoring for the signal (e.g., Alert signal) while in LPI mode can be substantial. Additionally, with traditional EEE, devices send data transmit data in bursts during normal modes and transition from LPI to normal mode often, which results in frequent data overhead (e.g., sleep time and wake time). This can be detrimental when the amount of data being transmitted from EEE transmitting device to the EEE receiving device is not large (e.g., control data from a processor to a camera sensor within an automobile). Additionally, although the average power over LPI and burst of signal can be low, the peak power consumption can be high when data is transmitted in bursts at high data rates.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for data transmission using alert signals to carry data, which can be used in such applications as data network communications between sensors (e.g., cameras, motion, radar, etc.) and computing equipment within vehicles (e.g., smart and autonomous cars). For example, some embodiments can be used for data transmission between two physical layer devices, where first physical device transmits data to a second physical layer device at a first data rate (e.g., low data rate) using a data-carrying alert signal, and where the first physical layer device receives data from the second physical layer device at a second data rate (e.g., high data rate, such as one based on a standard specification) that is higher than the first data rate (e.g., lower data rate is 1 Mbps and the high data rate is 10 Gbps). For instance, the first physical layer device can be coupled to (or form a part of) a sensor data aggregator, and the second physical layer device can be coupled to (or form a part of) a sensor. The first physical layer device of the sensor data aggregator can transmit sensor control data (e.g., to control sensor configuration) to the second physical layer of the sensor at the first data rate (e.g., low speed rate), and the second physical layer device of the sensor (e.g., camera sensor) can transmit sensor data (e.g., video data) to the first physical layer device of the sensor data aggregator at the second data rate (e.g., high speed rate).

In particular, various embodiments provide for generating and transmitting a data-carrying alert signal from one physical layer device to another physical layer device, where the data-carrying alert signal is generated by modulating an alert signal to carry data from the one physical layer device to the other physical layer device. According to various embodiments, the data-carrying alert signal is generated by modulating an alert signal to carry the data, where the alert signal is similar to an alert signal defined (e.g., specified) by an Energy Efficient Ethernet (EEE) standard (e.g., IEEE 802.3ch). For example, a data-carrying alert signal that carries a data bit of 0 can be generated by transmitting an alert signal (without modification) as defined by an EEE standard (e.g., IEEE 802.3ch), while a data-carrying alert signal that carries a data bit of 1 can be generated by transmitting an inverse polarity of the alert signal defined by the EEE standard. In this way, some embodiments modulate (e.g., PAM2 modulate) an alert signal of an EEE standard to carry data (e.g., non-training data, such as user data or application data). For some embodiments, an EEE transceiver (e.g., one that supports IEEE 802.3ch) is adapted/configured to support data-carrying alert signals. A data-carrying alert signal of some embodiments is at or above 320 ns in length (e.g., 363 ns frame), which can facilitate a through put of approximately 3 Mbps. Additionally, the data-carrying alert signal of some embodiments comprises at least 2040 PAM2 symbols. Data bits carried by a data-carrying alert signal can be packed into a frame of the data-carrying alert signal, where the frame is similar to a frame of an alert signal defined by an EEE standard. In addition to user or application data, a frame of the data-carrying alert signal can carry data bits with other information, such as control information, OAM bits, forward error correction (FEC) (e.g., Reed-Solomon or other codes) and parity bits, and interleaving.

Various embodiments provide for data transmission (using a data-carrying alert signal transmitted from one physical layer device to another physical layer device) with echo cancellation that is simpler than traditional echo cancellation approaches. Conventional echo cancellation is usually a complex function used in a full-duplex transceiver (e.g., a high-speed full-duplex transceiver), and the power and the complexity of the conventional echo cancellation increases with data speed (e.g., grow by square of baud-rate). An echo canceller of some embodiments can achieve lower power consumption (e.g., more power-efficient), have less complexity, and occupy less silicon area than a traditional echo canceller of a physical layer device. According to some embodiments, an echo canceller of a physical layer device comprises (e.g., implemented as) a set of poly-phase filters, where the set of poly-phase filters can receive a low frequency transmit data signal (e.g., the data that modulates the alert signal to generate a data-carrying alert signal, as described herein) as input, and where the set of poly-phase filters uses a composite echo channel as its set of coefficients (e.g., as its filter coefficients). The composite echo channel can comprise a convolution of an echo signal received (from the channel) by a physical layer device and a data-carrying alert signal transmitted by the physical layer device. The low frequency transmit data signal provided by using an alert signal as the carrier signal (e.g., approximately 3 MHz) can enable an embodiment to achieve a low data rate, and can enable the echo canceller of the embodiment to be less complex than a traditional echo canceller. A traditional echo canceller would otherwise be needed if a high frequency transmit data signal (e.g., 5.6 GHz) was to be used to transmit data.

According to some embodiments, a first physical layer device is configured to receive a data-carrying alert signal from a second physical layer device, and demodulate the data-carrying alert signal to generate (e.g., extract) carried data (e.g., user or application data). The first physical layer device of an embodiment can receive and demodulate the data-carrying alert signal without need for echo cancellation, and without equalization. Additionally, the analog blocks in the receiver (e.g., analog-digital-converter (ADC)) of the first physical layer device can operate in low power mode while receiving a data-carrying alert signal.

To facilitate training between two physical layer devices, a first physical layer device that generates and transmits a set of data-carrying alert signals (e.g., sequence of alert signals) to carry training data to a second physical layer device, where the training data comprises known training data. For instance, the training data can comprise a pseudo-random bit sequence (PRBS). According to some embodiments, during training, an echo canceller (e.g., 2-tap echo canceller) of the first physical layer device can train for a composite response.

By use of various embodiments, two physical layer devices can facilitate a power-efficient data communication (e.g., asymmetric data communication). An embodiment can enable a first physical layer device to transmit data at a lower data rate using data-carrying alert signals and a power-efficient and simple echo canceller. During training, an embodiment can enable the first physical layer device to train while maintaining a lower power consumption. Additionally, an embodiment can enable a second physical layer device to receive data-carrying alert signals (from the first physical layer device) while in low power mode, and to do so without need for the second physical layer device to perform equalizer training or echo canceller training.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
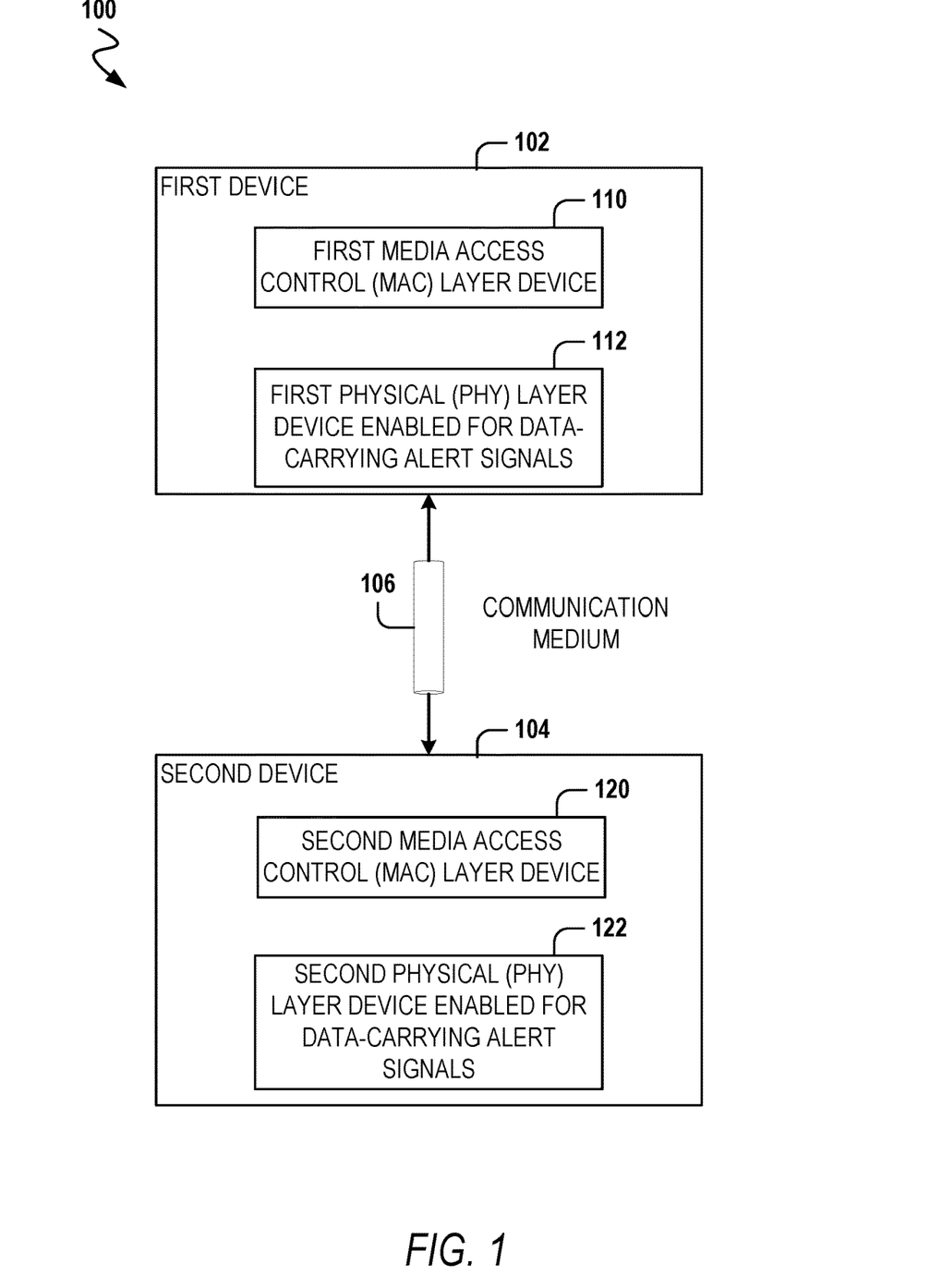
FIG. 1 is a block diagram illustrating an example system comprises a first device and a second device that can use data transmission with alert signals to carry data, in accordance with some embodiments.

FIG. 1 is a block diagram illustrating an example system 100 comprises a first device 102 and a second device 104 that can use data transmissions (e.g., lower power data transmissions) that uses alert signals to carry data, in accordance with some embodiments. Depending on the embodiment, the first device 102 can be implemented (at least in part) by machine 700 of FIG. 7, and the second device 104 can be implemented (at least in part) by machine 700 of FIG. 7. As shown, the communication medium 106 operatively couples the first device 102 to the second device 104, where the communication medium 106 can support a data link (e.g., an asymmetric data link). The communication medium 106 can comprise a wire (e.g., twisted pair) that permits transmission of an analog signal. As also shown, the first device 102 comprises a first media access control (MAC) layer device 110, and a first physical (PHY) layer device 112 enabled for data-carrying alert signals as described herein, and the second device 104 comprises a second media access control (MAC) layer device 120, and a second physical (PHY) layer device 122 enabled for data-carrying alert signals as described herein.

Each of the first physical layer device 112 and the second physical layer device 122 can implement features or methodologies described herein with respect to various embodiments. The first media access control (MAC) layer device 110 represents one or more components of the first device 102 that implement or enable a MAC layer of a network stack of the first device 102, and the first physical (PHY) layer device 112 represents one or more components of the first device 102 that implement or enable a PHY layer of a network stack of the first device 102. The second media access control (MAC) layer device 120 represents one or more components of the second device 104 that implement or enable a MAC layer of a network stack of the second device 104, and the second physical (PHY) layer device 122 represents one or more components of the second device 104 that implement or enable a PHY layer of a network stack of the second device 104.

Though not illustrated, in certain applications, the first device 102 can be communicatively coupled to one or more other devices (e.g., one or more sensor devices) that generate or otherwise provide the first device 102 with data (e.g., data packets) that need to be transmitted to the second device 104. Accordingly, via the first physical layer device 112, the first device 102 can transmit the data received from the one or more other devices to the second device 104 (e.g., using a high data rate, such as one based on IEEE 802.11ch). Depending on the embodiment, the one or more devices can comprise one or more sensors or other peripheral devices that generate or provide video data or radar/lidar data according to a data standard. The second physical layer device 122 of the second device 104 can receive the data from the first device 102. Subsequently, the data received at the second device 104 can be processed by a processor that is part of, or operatively coupled to, the second device 104. For example, the received data can comprise video data from a camera sensor device that can be processed at the second device 104. The processor of the second device 104 can include, without limitation, an electronic control unit (ECU), a central processing unit (CPU), or a graphic processing units (GPU). Via the second physical layer device 122, the second device 104 can transmit data to first device 102 using one or more data-carrying alert signals as described herein, which can achieve a low data rate transmission to from the second device 104 to the first device 102 while maintaining low power consumption. The data carried by the data-carrying alert signals can comprise, for example, control information for a sensor device (e.g., camera sensor device control information) coupled to the first device 102.

Figure 2:
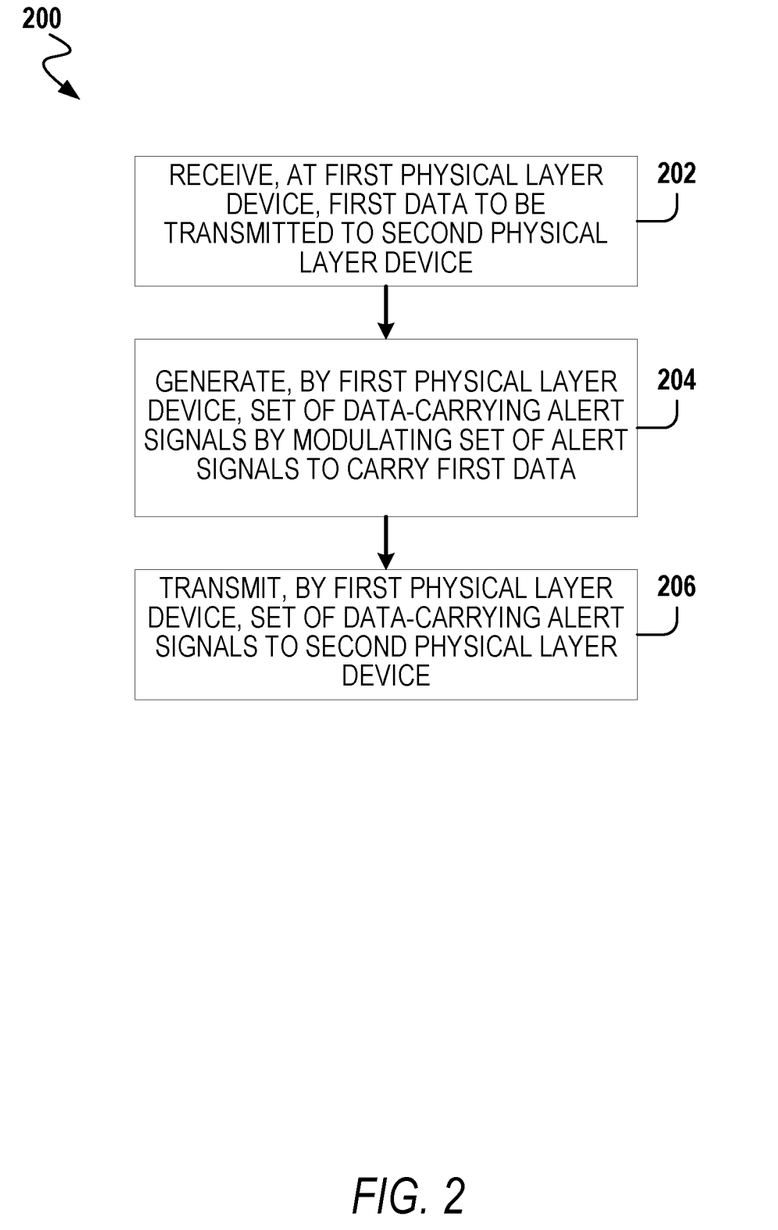
FIGS. 2 through 4 are flowcharts illustrating example methods for data transmission using alert signals, in accordance with some embodiments.
Figure 3:
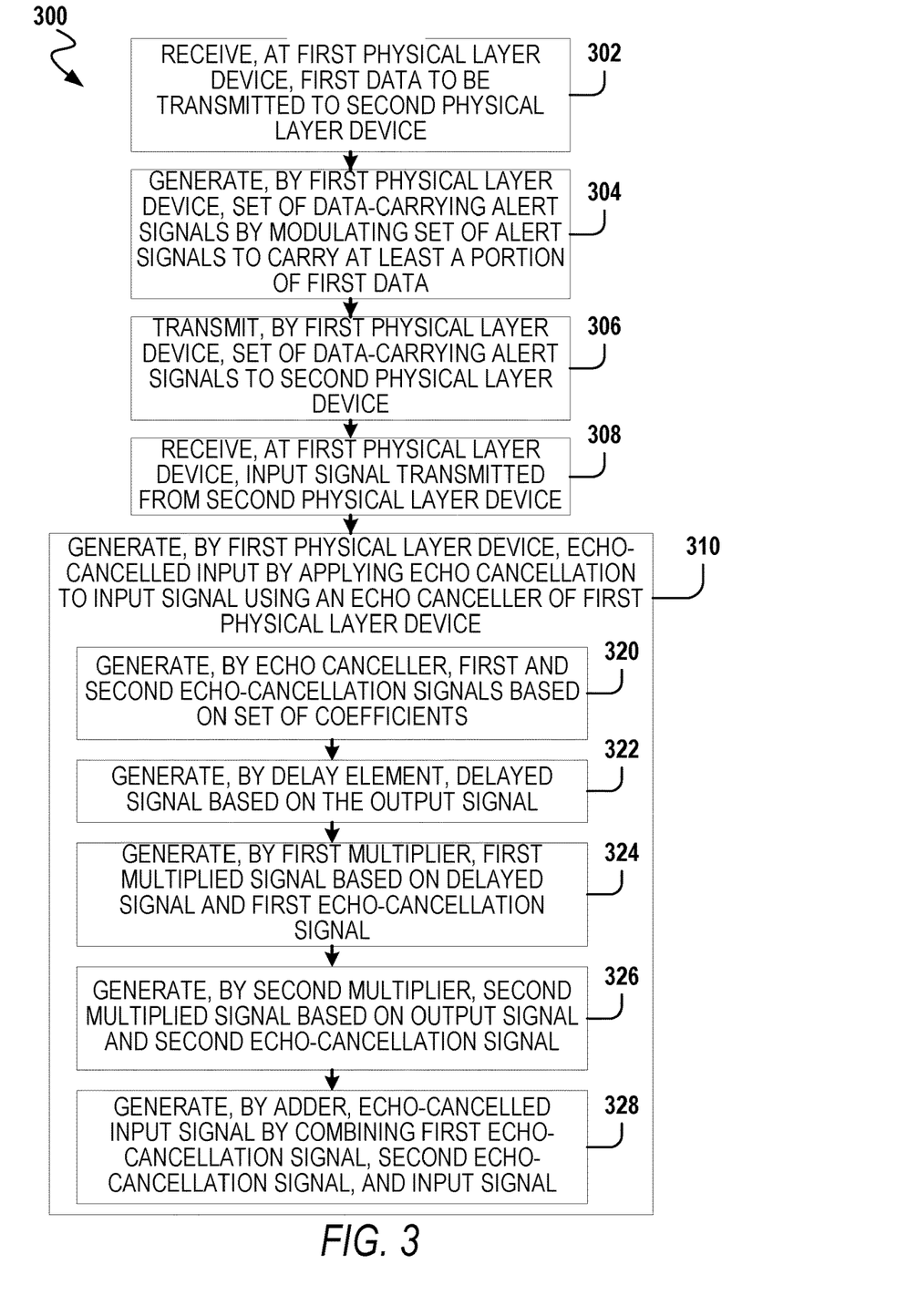
Figure 4:
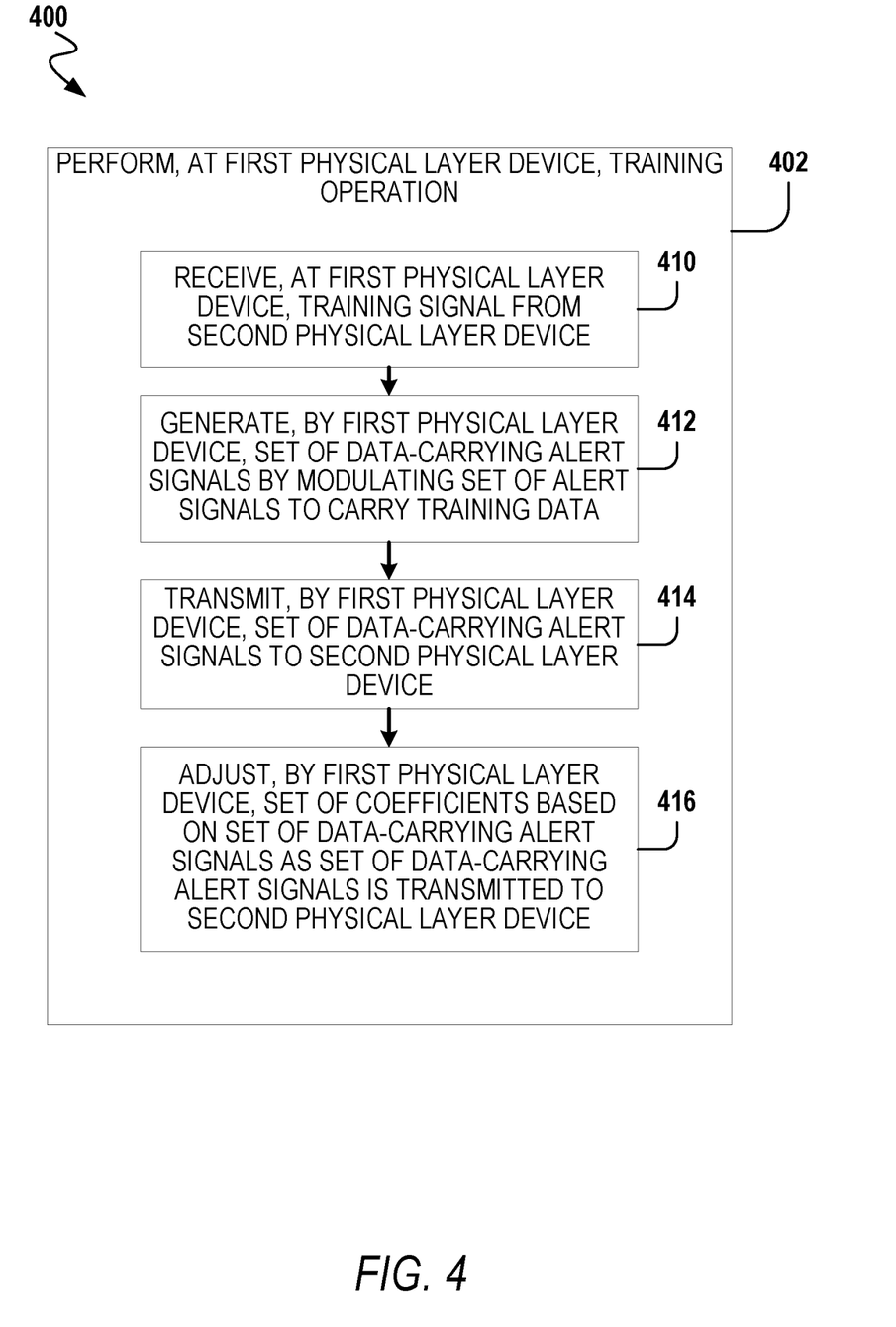

FIGS. 2 through 4 are flowcharts illustrating example methods 200, 300, 400 for data transmission using alert signals to carry data, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the methods 200, 300, 400 may be performed by the first physical (PHY) layer device 112 or the second physical (PHY) layer device 122 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 2, at operation 202, a first physical layer device (e.g., 112) receives first data to be transmitted to a second physical layer device (e.g., 122) over a data transmission medium. For some embodiments, the first data comprises user data or application data, such as sensor data generated by a sensor device (e.g., camera senor). In certain applications, the second physical layer device can be associated with (e.g., coupled or form a part of) a sensor device, and the first physical layer device can be associated with (e.g., coupled or form a part of) a sensor data aggregator device. Where the second device 104 comprises a sensor device, the first data to be transmitted to the second physical layer device can comprise sensor control data for the sensor device.

Continuing with operation 204, the first physical layer device (e.g., 112) generate a set of data-carrying alert signals by modulating a set of alert signals to carry the first data received at operation 202. According to some embodiments, a single data-carrying alert signal is generated by modulating an alert signal defined by an EEE standard (e.g., IEEE 802.3ch). Additionally, for some embodiments, a single data-carrying alert signal carrying one or more data bits is generated by modulating an alert signal to have an inverse polarity to represent a single data bit (e.g., data bit representing '1') of the first data. For instance, where the alert signal being used to a carry a set of data bits (e.g., data bit sequence) is based on an alert signal defined of an EEE standard, an embodiment can cause the alert signal to carry the set of data bits by modulating a portion of the alert signal to have an inverse polarity to represent each data bit of '1' in the set of data bits, and by transmitting a portion of the alert signal in accordance with an EEE standard (i.e., without modification to the standard definition) to represent each data bit of '0' in the set of data bits. In this way, an alert signal defined by an EEE standard can be modulated to carry a data bit sequence of first data (e.g., sensor control information data, etc.). An example of this is illustrated and described herein with respect to FIG. 5. An alert signal that is modulated by an embodiment can comprise a time length of at or above 320 ns (e.g., the modulated alert signal comprises a 363 ns frame). In accordance with a EEE standard, the alert signal can be modulated using a PAM modulation, such as a PAM2 modulation.

Eventually, at operation 206, the first physical layer device (e.g., 112) transmits the set of data-carrying alert signals to the second physical layer device (e.g., 122). For some embodiments, operations 204 and 206 can be performed as a single operation.

Referring now to FIG. 3, the method 300 transmits data using alert signals to carry data and receives data using an echo canceller (e.g., a 2-tap echo canceller), in accordance with some embodiments. For some embodiments, operations 302 through 306 are respectively similar to operations 202 through 206 described with respect to the method 200 of FIG. 2.

After operation 306, the method 300 continues with operation 308, where the first physical layer device (e.g., 112) receives an input signal transmitted from the second physical layer device (e.g., 122). For some embodiments, the input signal received from the second physical layer device carries data being transmitted a high data rate (e.g., data rate that is higher than the data rate achieved by the data-carrying alert signals being transmitted by operation 306).

Subsequently, at operation 310, the first physical layer device (e.g., 112) generates an echo-cancelled input signal by applying echo cancellation to the input signal (received by operation 308) using an echo canceller of the first physical layer device. According to some embodiments, the echo canceller of the first physical layer device comprises a set of poly-phase filters, and the set of poly-phase filters operates based on a set of coefficients (e.g., filter coefficients). For some embodiments, the set of coefficients can be set or adjusted when training is being performed between the first physical layer device and the second physical layer device (e.g., 122).

Figure 6:
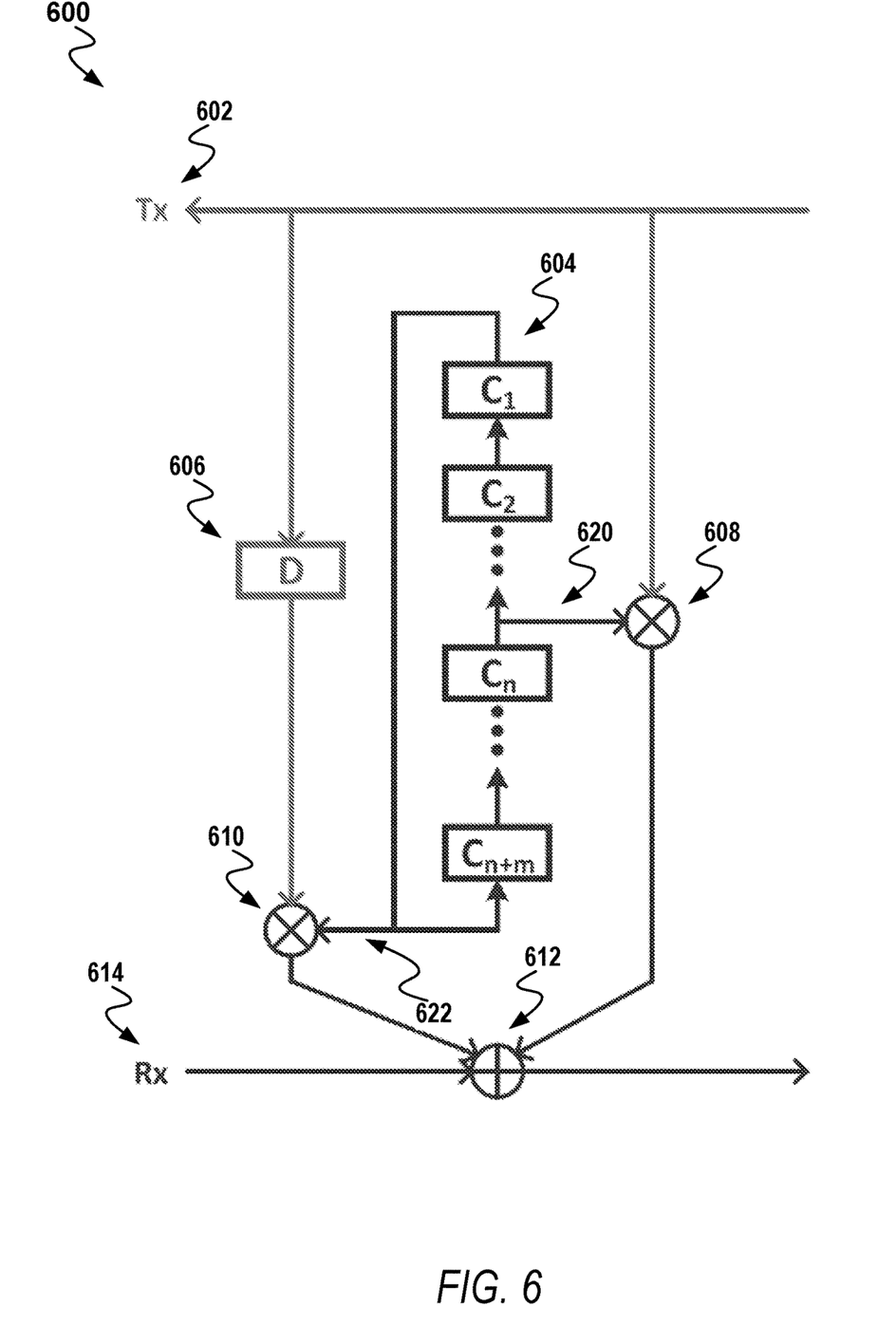
FIG. 6 illustrates an example implementation of echo cancellation within a physical layer device, in accordance with some embodiments.

An example implementation of operation 310 is illustrated and described herein with respect to FIG. 6. As shown, operation 310 is performed by operations 320 through 328. At operation 320, an echo canceller (e.g., 604 in FIG. 6) of the first physical layer device (e.g., 112) generates a first echo-cancellation signal and a second echo-cancellation signal based on the set of coefficients of the echo canceller, where the first echo-cancellation signal is different from the second echo-cancellation signal. At operation 322, a delay element (e.g., 606 in FIG. 6) of the first physical layer device (e.g., 112) generates a delayed signal based on an output signal being transmitted to the second physical layer device by the first physical layer device. At operation 324, a first multiplier (e.g., 610 in FIG. 6) of the first physical layer device generates a first multiplied signal based on the delayed signal and the first echo-cancellation signal. At operation 326, a second multiplier (e.g., 608 in FIG. 6) of the first physical layer device generates a second multiplied signal based on the output signal and the second echo-cancellation signal. Eventually, at operation 328, an adder (e.g., 612 in FIG. 6) of the first physical layer device generates the echo-cancelled input signal by combining the first echo-cancellation signal, the second echo-cancellation signal, and the input signal. According to some embodiments, the method 300 is configured to operate based on an echo response (e.g., impulse response of the echo channel) spanning at least two alert symbols. For some embodiments, if the echo response has a longer span then two alert symbols, the echo cancellation implementation (e.g., the poly-phase implementation in FIG. 6) would comprise more delay elements (e.g., 606), more multipliers (e.g., 610), and more inputs for the adder (e.g., 612).

Referring now to FIG. 4, the method 400 comprises an operation 402, a first physical layer device (e.g., 112) performs a training operation, in accordance with some embodiments. Depending on the embodiment, operation 402 can be performed as part of the method 200 or the method 300 (e.g., prior to the start of the method 200 or the method 300).

As shown, operation 402 is performed by operations 410 through 416. At operation 410, the first physical layer device receives a training signal from the second physical layer device (e.g., 122). At operation 412, the first physical layer device generates a set of data-carrying alert signals by modulating a set of alert signals to carry training data. According to some embodiments, the training data comprises a pseudo-random byte sequence (PSRB) known by the second physical layer device. At operation 414, the first physical layer device transmits the set of data-carrying alert signals to the second physical layer device.

Eventually, at operation 416, the first physical layer device adjusts a set of coefficients (e.g., filter coefficients), of an echo canceller of the first physical layer device, based on the set of data-carrying alert signals as the set of data-carrying alert signals is transmitted to the second physical layer device. According to some embodiments, as first physical layer device transmits the set of data-carrying signals, the first physical layer device receives an echo (e.g., echo response) over the channel between the first and second physical layer devices. Since the echo canceller already knows what the echo should look like (based on the transmission of the set of data-carrying alert signals that is carrying PRBS training data), the first physical layer device can adjust the set of coefficients based on this knowledge.

Figure 5:
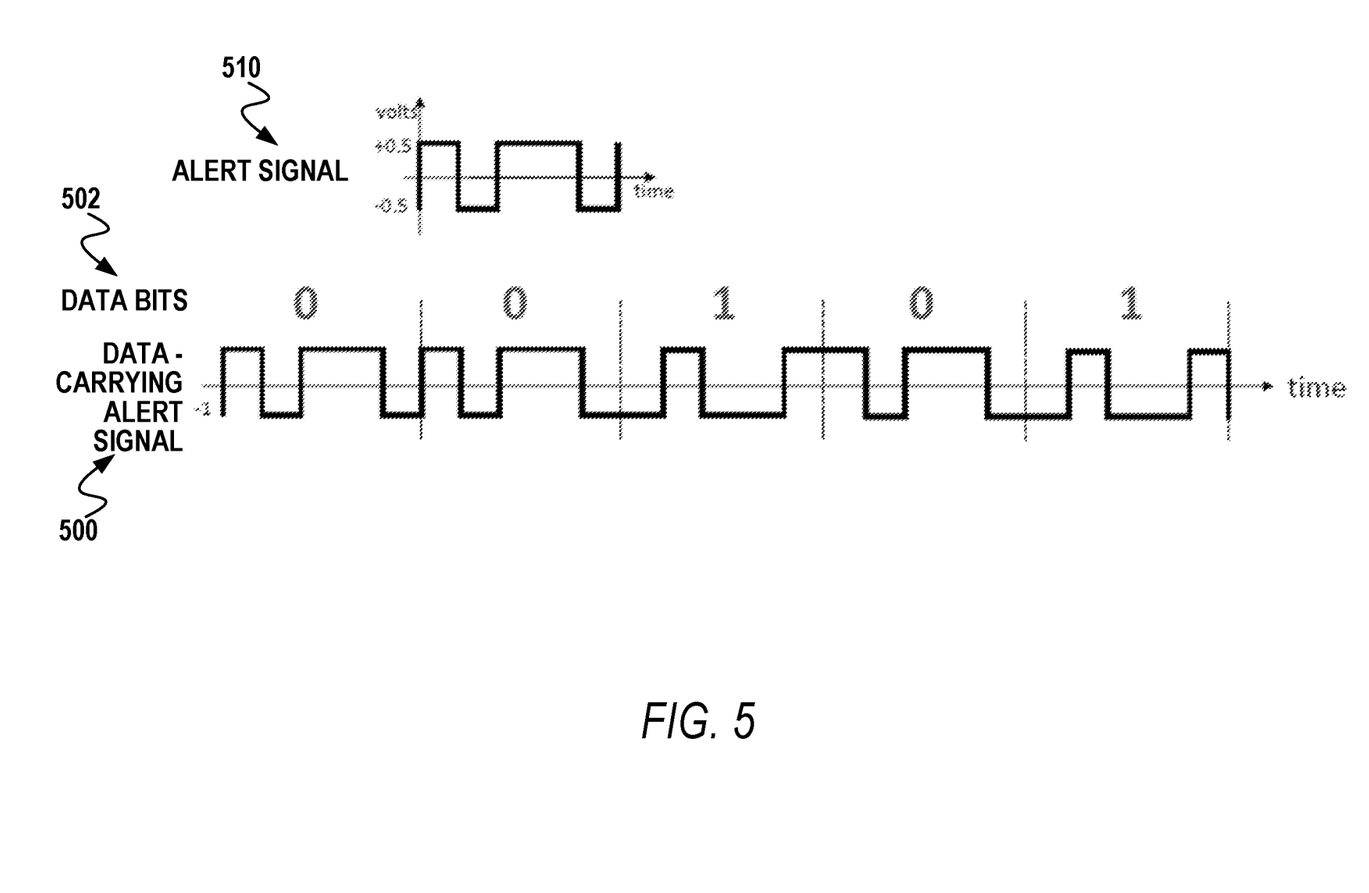
FIG. 5 is a diagram illustrating an example of a data-carrying alert signal generated by modulating an alert signal to carry data, in accordance with some embodiments.

FIG. 5 is a diagram illustrating an example of a data-carrying alert signal 500 generated by modulating an alert signal to carry data, in accordance with some embodiments. In FIG. 5, the data-carrying alert signal 500 is modulated to carry data bits 502, which comprises a data bit sequence of '00101'. For some embodiments, the Alert signal 510 comprises an Alert signal defined by an EEE standard prior to modification. As shown, where a portion of the data-carrying alert signal 500 carries a data bit representing '0' of the data bits 502, the data-carrying alert signal 500 comprises the alert signal 510 as-is (without modification). Where a portion of the data-carrying alert signal 500 carries a data bit representing '1' of the data bits 502, the data-carrying alert signal 500 comprises the alert signal 510 with inverted polarity. For some embodiments, a reverse scheme is used to carry data using an alert signal (e.g., inverted polarity of a portion of an alert signal to represent a data bit of '0', and leaving a portion of the alert signal as-is to represent a data bit of '1').

FIG. 6 illustrates an example implementation 600 of echo cancellation within a physical layer device, in accordance with some embodiments. In FIG. 6, the implementation 600 comprises a signal output 602, a signal input 614, an echo canceller 604, a delay element 606, a first multiplier 610, a second multiplier 608, and an adder 612. The echo canceller 604 generates a first echo-cancellation signal 622, and generates a second echo-cancellation signal 620. The signal output 602 can transmit an output signal from a first physical layer device to a second physical layer device (e.g., transmitting the set of data-carrying alert signals to the second physical layer device). The signal input 614 can receive an input signal transmitted to the first physical layer device from the second physical layer device.

As illustrated in FIG. 6, the echo canceller 604 of some embodiments comprises a 2-tap echo canceller. As noted herein, the set of poly-phase filters of the echo canceller 604 can receive a low frequency transmit data signal (e.g., the data that modulates the alert signal to generate a data-carrying alert signal, as described herein) as input, and the set of poly-phase filters can use a composite echo channel as its set of coefficients (e.g., as its filter coefficients). Some embodiments can use other multi-tap echo cancellers. Though the echo cancellation implementation 600 illustrated in FIG. 6 is configured for an echo response (e.g., impulse response on echo channel) that spans two alert symbols, some embodiments use an echo cancellation implementation that accommodates a longer echo response. Where the echo response spans more than two alert symbols, some embodiments modify the echo cancellation implementation 600 to comprise more delay elements (e.g., 606), more multipliers (e.g., 610), and more inputs for the adder (e.g., 612). For example, the implementation 600 could be modified to include one or more additional delay elements coupled to the delay element 606) to accommodate a longer echo response.

As shown, an input of the delay element 606 is coupled to a transmission data path that is coupled to the signal output 602. An output of the delay element is coupled to a first input of the first multiplier 610. A second input of the first multiplier 610 being is coupled to a first output of the echo canceller 604, where the first output of the echo canceller 604 provides the first echo-cancellation signal 622. An output of the first multiplier is coupled to a first input of the adder 612. A first input of the second multiplier 608 is coupled to the transmission data path. A second input of the second multiplier 612 is coupled to a second output of the echo canceller 604, where the second output of the echo canceller 604 provides the second echo-cancellation signal 620. An output of the second multiplier 608 is coupled to a second input of the adder 612. A third input of the adder 612 is coupled to a receiving data path that is coupled to the signal input 614.

According to various embodiments, the echo canceller 604 comprises a set of poly-phase filters that operate based on a set of coefficients (e.g., filter coefficients) $C_1$ through $C_{n+m}$, where n represents a length of an alert signal and m represents a length of an echo response. According to some embodiments, the implementation 600 takes advantage of a repeated samples of a transmitted alert signal.

Figure 7:
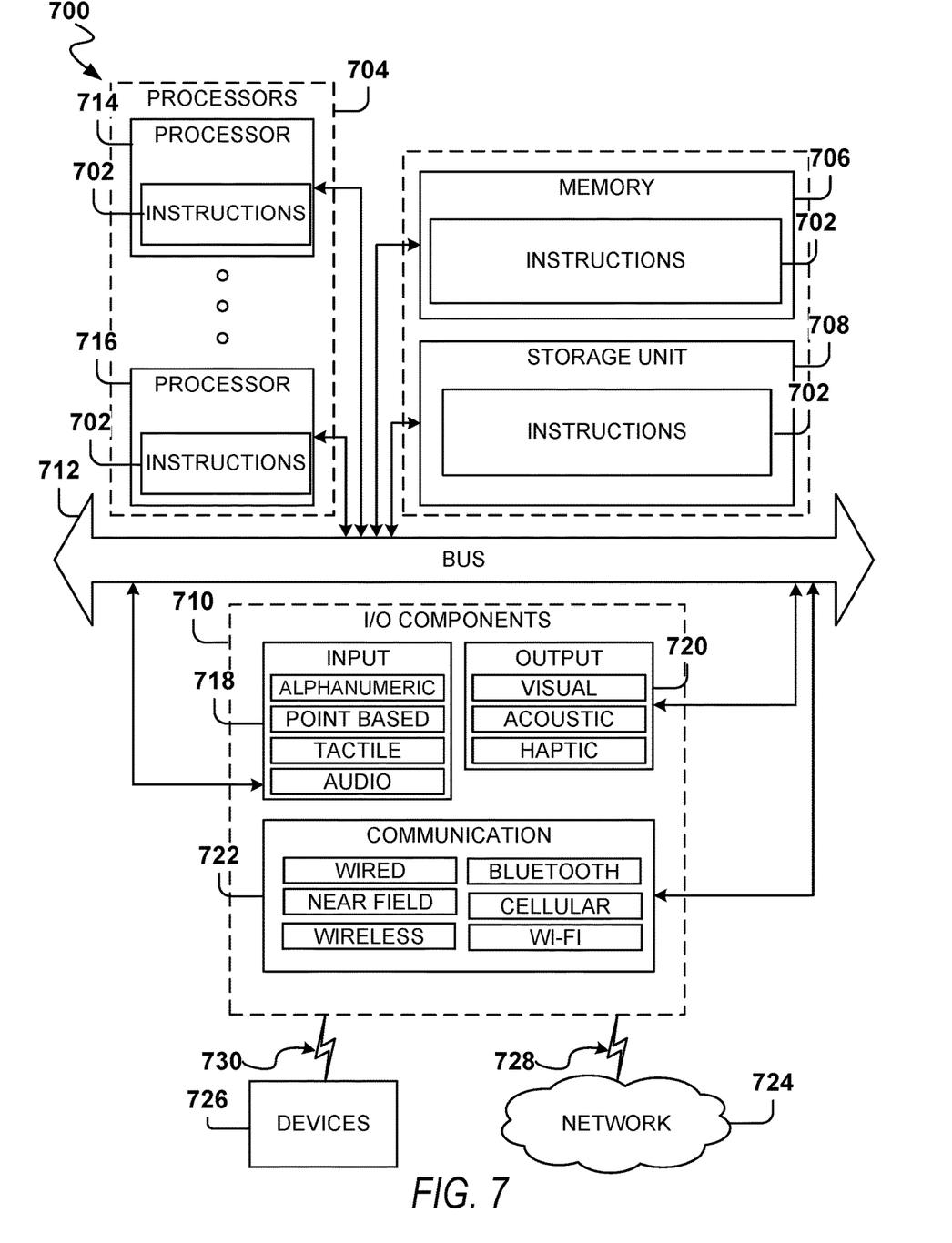
FIG. 7 is a block diagram illustrating components of an example machine that can use one or more embodiments discussed herein.

FIG. 7 is a block diagram illustrating components of an example machine 700 that can use one or more embodiments discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform one or more operations that may make use of one or more of the methodologies discussed herein. For example, the instructions 702 include executable code that causes the machine 700 to execute one or more operations that cause a physical (PHY) layer device of the machine 700 (e.g., embodied by communication components 722) to perform the method 200, 300, or 400. The machine 700 may be coupled (e.g., networked) to other machines. Depending on the embodiment, the machine 700 can implement at least some portion of the first device 102 or the second device 104.

By way of non-limiting example, the machine 700 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702.

The machine 700 may include processors 704, memory 706, a storage unit 708, and I/O components 710, which may be configured to communicate with each other such as via a bus 712. In some embodiments, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform one or more operations that makes use of one or more of the methodologies described herein (e.g., the method 200, 300, or 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), pointbased input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730 respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices. According to various embodiments, the communication components 722 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
   a first physical layer device comprising:
      an echo canceller comprising a set of poly-phase filters, the set of poly-phase filters operating based on a set of coefficients;
      a signal output for transmitting an output signal to a second physical layer device; and
      a signal input for receiving an input signal transmitted from the second physical layer device, the first physical layer device being configured to communicate data with the second physical layer device over a data transmission medium and to perform operations comprising:
         performing a training operation that adjusts the set of coefficients of the echo canceller, the training operation comprising:
            generating a first set of data-carrying alert signals by modulating a second set of alert signals to carry data;
            transmitting, by the signal output, the first set of data-carrying alert signals to the second physical layer device; and
            adjusting the set of coefficients based on the first set of data-carrying alert signals as the first set of data-carrying alert signals is transmitted to the second physical layer device;
         receiving first data to be transmitted to the second physical layer device;
         generating a second set of data-carrying alert signals by modulating a set of alert signals to carry the first data;
         transmitting, as part of the output signal, the second set of data-carrying alert signals to the second physical layer device via the signal output;

receiving, at the first physical layer device, an input signal transmitted from the second physical layer device; and generating an echo-cancelled input signal by applying echo cancellation to the input signal using the echo canceller.

2. The system of claim 1, wherein the second physical layer device is associated with a sensor device.

3. The system of claim 2, wherein the first physical layer device is associated with a sensor data aggregator device.

4. The system of claim 3, wherein the first data comprises sensor control data for the sensor device.

5. The system of claim 3, wherein the sensor device comprises a camera sensor.

6. The system of claim 1, wherein at least one alert signal of the second set of alert signals is modulated to have an inverse polarity to represent a single bit of the first data.

7. The system of claim 1, wherein at least one alert signal of the second set of alert signals is based on an alert signal defined by an Energy Efficient Ethernet (EEE) standard.

8. The system of claim 1, wherein at least one alert signal of the second set of alert signals comprises at least 2040 PAM2 symbols.

9. The system of claim 1, wherein at least one alert signal of the second set of alert signals has a time length of at or above 320 ns.

10. A method comprising:
performing, by a first physical layer device, a training operation that adjusts a set of coefficients of an echo canceller of the first physical layer device, the training operation comprising:
generating, by the first physical layer device, a first set of data-carrying alert signals by modulating a first set of alert signals to carry data;
transmitting, by the first physical layer device, the first set of data-carrying alert signals to a second physical layer device; and
adjusting, by the first physical layer device, the set of coefficients based on the first set of data-carrying alert signals as the first set of data-carrying alert signals is transmitted to the second physical layer device;
receiving, at the first physical layer device, first data to be transmitted to the second physical layer device;
generating, by the first physical layer device, a second set of data-carrying alert signals by modulating a second set of alert signals to carry the first data;
transmitting, as part of an output signal transmitted to the second physical layer device by the first physical layer device, the second set of data-carrying alert signals to the second physical layer device;
receiving, at the first physical layer device, an input signal transmitted from the second physical layer device; and
generating an echo-cancelled input signal by applying echo cancellation to the input signal using the echo canceller of the first physical layer device.

11. The method of claim 10, wherein the second physical layer device is associated with a sensor device.

12. The method of claim 11, wherein the first physical layer device is associated with a sensor data aggregator device.

13. The method of claim 12, wherein the first data comprises sensor control data for the sensor device.

14. The method of claim 12, wherein the sensor device comprises a camera sensor.

15. The method of claim 10, wherein at least one alert signal of the second set of alert signals is modulated to have an inverse polarity to represent a single bit of the first data.

16. The method of claim 10, wherein at least one alert signal of the second set of alert signals is based on an alert signal defined by an Energy Efficient Ethernet (EEE) standard.

17. The method of claim 10, wherein at least one alert signal of the second set of alert signals comprises at least 2040 PAM2 symbols.

18. The method of claim 10, wherein at least one alert signal of the second set of alert signals has a time length of at or above 320 ns.

19. A system comprising:
a first physical layer device configured to communicate data with a second physical layer device over a data transmission medium, the first physical layer device being further configured to perform operations comprising:
while the first physical layer device is in lower power mode based on Energy-Efficient Ethernet (EEE) as defined by an Ethernet standard:
receiving a set of data-carrying alert signals transmitted from the second physical layer device, the set of data-carrying alert signals comprising a set of alert signals modulated to carry first non-training data; and
generating the first non-training data at the first physical layer device by demodulating the set of data-carrying alert signals.

20. The system of claim 19, wherein the set of alert signals is a first set of alert signals, wherein the set of data-carrying alert signals is a first set of data-carrying alert signals, and wherein the operations further comprise:
performing, on the first physical layer device, a first training operation with the second physical layer device while in lower power mode, the first training operation comprising:
transmitting a training signal to the second physical layer device, the second physical layer device being configured to performing, on the second physical layer device, a second training operation that adjusts a set of coefficients of an echo canceller of the second physical layer device, the second training operation comprising:
receiving a training signal from the first physical layer device;
generating a second set of data-carrying alert signals by modulating a second set of alert signals to carry training data, the training data comprising a pseudo-random byte sequence known by the first physical layer device;
transmitting the second set of data-carrying alert signals to the first physical layer device; and
adjusting the set of coefficients based on the second set of data-carrying alert signals as the second set of data-carrying alert signals is transmitted to the first physical layer device; and
receiving the second set of data-carrying alert signals from the second physical layer device, the second set of data-carrying alert signals comprising the second set of alert signals that is modulated to carry the training data.

* * * * *